United States Patent [19]

Christiansen

[11] 4,155,407
[45] May 22, 1979

[54] HARROW COMPRISING TRANSVERSELY RECIPROCATING TEETH

[76] Inventor: Eyvind E. Christiansen, Snekkerup Maskinfabrik, DK-4140 Borup, Denmark

[21] Appl. No.: 870,504

[22] Filed: Jan. 18, 1978

[30] Foreign Application Priority Data

Jan. 21, 1977 [DK] Denmark .................... 257/77

[51] Int. Cl.² ........................................... A01B 19/06
[52] U.S. Cl. ........................................ 172/102; 74/60
[58] Field of Search ................. 172/102, 53; 74/60

[56] References Cited

U.S. PATENT DOCUMENTS

| 77,292 | 4/1868 | Kidd ..................................... 172/102 |
| 960,575 | 6/1910 | Negley ................................... 74/60 |
| 1,213,850 | 1/1917 | Emley ..................................... 74/60 |
| 1,751,887 | 3/1930 | Rose ..................................... 172/53 |
| 3,422,907 | 1/1969 | Gijzenberg .......................... 172/102 |

FOREIGN PATENT DOCUMENTS 1028443  2/1953  France ..................... 172/97

*Primary Examiner*—Paul E. Shapiro
*Attorney, Agent, or Firm*—Watson, Cole, Grindle & Watson

[57] ABSTRACT

A harrow comprising transversely with respect to the direction of travel of the harrow extending harrow teeth supporting beams, a shaft also extending transversely with respect to the direction of travel of the harrow, wobble discs secured to the shaft and cooperating with pairs of rollers connected to the beams in such a way that the beams and the harrow teeth supported thereby are reciprocated transversely with respect to the direction of travel of the harrow by rotation of the wobble discs, wherein two traverses being pivotally supported by the frame of the harrow about vertically extending axes, the traverses extending, in mid-positions of the traverses, in the direction of travel of the harrow, a beam being pivotally connected to the forward ends of the traverses and another beam being pivotally connected to the rear ends of the traverses, two roller carriers being pivotally connected to each of the traverses about vertically extending axes, each carrier supporting, at one of its ends, a roller cooperating with the corresponding wobble disc, the two roller carriers of each traverse being mutually connected by means of a connecting link pivotally connected to the frame of the harrow, in such a way that each traverse together with its roller carriers and the corresponding connecting link from a swinging parallelogram link suspension controlling the rollers so as to maintain the axes of the rollers in the direction of travel of the harrow during engagement between the rollers and paths provided on the wobble discs, the paths of the wobble discs being generated by generatrices extending perpendicular to the shaft of the wobble discs.

2 Claims, 2 Drawing Figures

HARROW COMPRISING TRANSVERSELY RECIPROCATING TEETH

BACKGROUND OF THE INVENTION

The present invention relates to a harrow comprising transversely with respect to the direction of travel of the harrow extending harrow teeth supporting beams, a shaft also extending transversely with respect to the direction of travel of the harrow, wobble discs secured to the shaft and cooperating with pairs of rollers connected to the beams in such a way that the beams and the harrow teeth supporting thereby are reciprocated transversely with respect to the direction of travel of the harrow by rotation of the wobble discs.

A harrow of the kind indicated above is known from U.S. Pat. No. 1,751,887. The wobble discs of this known harrow are planar circular discs secured to the corresponding shaft in such a way that the plane of each disc forms an angle with the longitudinal direction of the shaft. The beams to which the harrow teeth are secured are supported by means of frames which are slidably mounted with respect to the shaft of the discs. Each frame supports two rollers which engage opposite sides of a wobble disc. According to this prior art the rollers must be spaced apart so as to be able to accomodate the oblique disc therebetween. Accordingly, it is not possible to avoid gaps between a pair of rollers and the corresponding wobble disc and, accordingly, the beams supporting the harrow teeth will not be positively controlled.

SUMMARY OF THE INVENTION

The harrow according to the present invention is characterized by two traverses pivotally supported by the frame of the harrow about vertically extending axes, the traverses extending, in mid-positions of the traverses, in the direction of travel of the harrow, a beam being pivotally connected to the forward ends of the traverses and another beam being pivotally connected to the rear ends of the traverses, two roller carriers being pivotally connected to each of the traverses about vertically extending axes, each carrier supporting, at one of its ends, a roller cooperating with the corresponding wobble discs, the two rollers carriers of each traverse being mutually connected by means of a connecting link pivotally connected to the frame of the harrow, in such a way that each traverse together with its roller carriers and the corresponding connecting link form a swinging parallelogram link suspension controlling the rollers so as to maintain the axes of the rollers on the direction of travel of the harrow during engagement between the rollers and paths provided on the wobble discs, the paths of the wobble discs being generated by generatrices extending perpendicular to the shaft of the wobble discs. By means of this construction it is achieved that the rollers, during the reciprocating movement of the beams perpendicular to the direction of travel of the harrow, are controlled in such a way that the direction of their axes is not changed, which, combined with the particular form of the paths of the wobble discs, secures an excellent control of the beams and, accordingly, also of the harrow teeth supported thereby. Moreover, the suspension of the beams by means of the traverses and the mounting of the traverses on the frame of the harrow secure, that the rather heavy loads which may be applied to the harrow teeth from the soil, are not transferred to the driving system comprising the rollers and the wobble discs, but are taken up by the traverses and the frame of the harrow. In order to further relieve the driving systems of such loads, each of the pivot connections between the ends of the traverses and the beams may according to a further embodiment of the present invention comprise a pivot secured to the corresponding traverse, a sleeve consisting of elastomeric material surrounding the pivot and a bushing secured to the corresponding beam and surrounding the sleeve of elastomeric material.

DESCRIPTION OF THE PREFERRED EMBODIMENT

Figure 1:
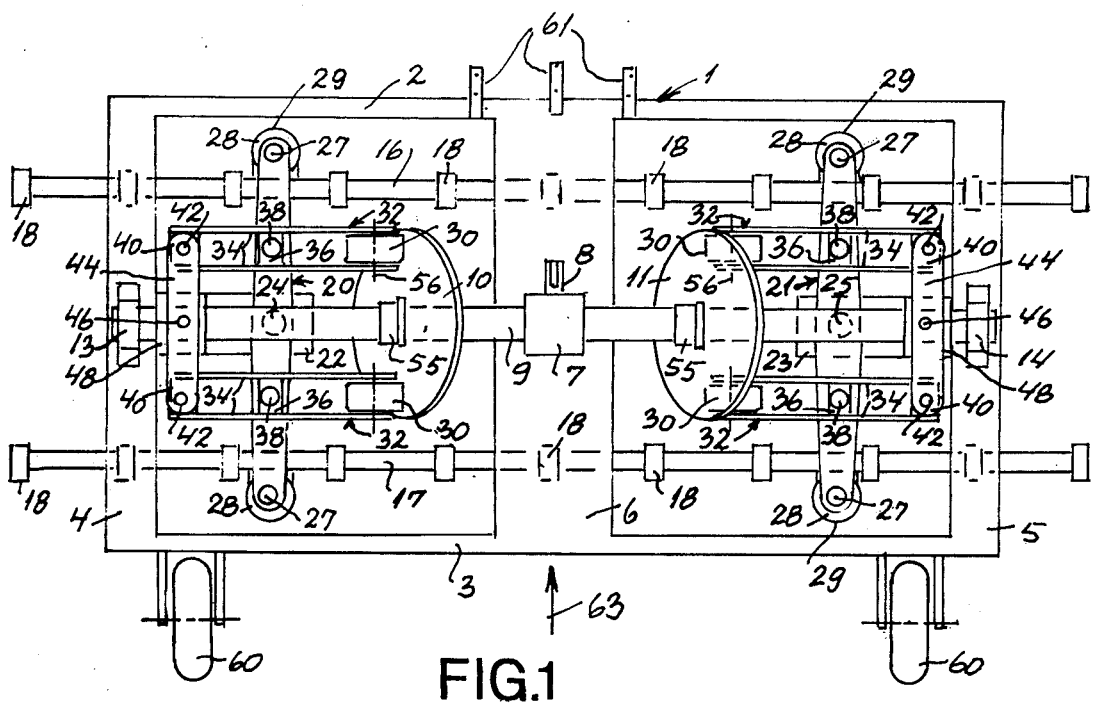
FIG. 1 diagrammatically shows a plan view of embodiment of the harrow.

The harrow illustrated comprises a frame 1 consisting of two frame members 2 and 3 extending perpendicular to the direction of travel of the harrow, which is indicated by means of an arrow 63, two longitudinally extending side frame members 4 and 5 and a longitudinally extending centre frame member 6. To each of the two side frame members 4 and 5, frame members 22 and 23, respectively, are secured so that these members 22 and 23 extend inwardly toward the centre frame member 6. A gear box 7 containing a pair of bevel gears is secured, e.g. by bolts (not shown) to the upper surface of the centre frame member 6. An input shaft 8 is secured to one of the gears in the box 7 and projects from the box so as to be connected to a drive shaft of a tractor (not shown) which moves the harrow. The other gear in the gear box 7 is secured to a shaft 9 arranged perpendicular to the direction of movement 63 and to which two wobble discs 10 and 11 are secured. The outer ends of the shaft 9 are supported by bearings secured to the side frame members 4 and 5.

The harrow comprises two transversely extending beams 16 and 17 to which harrow teeth (indicated by quadrangles 18) are secured.

The two beams 16 and 17 are suspended with respect to the frame by means of two traverses 20 and 21 pivotally supported by the frame members 22 and 23 by means of bearings 24 and 25. The two traverses 20 and 21 extend, in a mid-position, in the direction of travel 63 of the harrow. Each traverse 20,21 comprises two cross bars one of which extends above and the other of which extends below the corresponding frame member 22 and 23, respectively. The bearings 24 and 25 are double conical bearings and, accordingly, the two traverses 20 and 21 are pivotally in a stable way about the vertical axes of the bearings 24 and 25. Each of the upper cross bars of the traverses 20 and 21 passes below the shaft 9.

The beams 16 and 17 are connected to the forward and the rear ends, respectively, of the traverses 20 and 21 by elastomeric suspensions. Each of the suspensions comprises a central pivot 27 secured to the corresponding traverse, viz. between the upper and the lower cross bars of the traverse in question. Each of the central pivots is surrounded by a sleeve 28 consisting of elastomeric material which is surrounded by a steel bushing 29 secured e.g. by welding to the corresponding beam 16,17. Accordingly, it will be understood that the beams 16 and 17 extends between the upper and lower cross bars of the two traverses 20 and 21.

Two rollers 30,30 cooperate with each of the wobble discs 10, 11. Each roller 30 is rotatably supported at the end of a roller carrier 32. Each roller carrier 32 comprises two side members 34 mutually connected between their ends by a block 36 comprising a vertically extending pivot 38 by means of which the roller carrier in question is pivotally supported by the corresponding traverse. The ends of the side members 34,34 of each roller carrier, opposite the ends at which the roller is arranged, are mutually connected by means of a further block 40 having a vertically extending pivot 42. The two roller carriers cooperating with each of the wobble discs are connected to each other by means of a link 44 which is pivotally connected to the pivots 42,42 of the corresponding roller carriers. Each of the connecting links 44 is pivotally supported with respect to the frame of the harrow by means of a pivot 46 which is supported by a bridge 48 which by means of downwardly extending legs, one at each side of the shaft 9, is secured to the corresponding frame member 22 and 23, respectively. The distance, as measured in the horizontal direction, between the two pivots 38 and 42 of each roller carrier corresponds to the distance between the pivot 24,25 of the corresponding traverse and the pivot 46 of the connecting link 44. Accordingly, it will be understood that the two roller carriers cooperating with each wobble disc together with the corresponding traverse and the corresponding connecting link form a swinging parallelogram link suspension.

Figure 2:
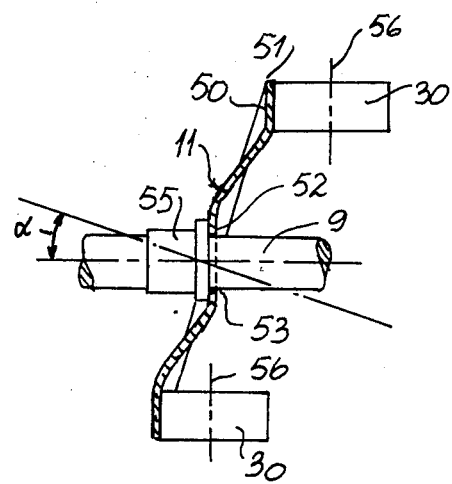
FIG. 2 shows a part of a wobble disc in plan view and partly in section.

One of the wobble discs 11 is illustrated in FIG. 2 in plan view and partly in section. Due to the fact that the two wobble discs 10 and 11 correspond to each other it will only be necessary to explain one of the discs in detail. The disc consists of an outer roller engagement path 50 for cooperation with the corresponding rollers 30,30. The roller engagement path 50 is outwardly defined by an edge 51 extending along a circle, the axis of which forms an angle α with the shaft 9. The surface of the roller engagement path is generated by generatrices extending perpendicular to the longitudinal direction of the shaft 9 and intersecting the circle mentioned above. Accordingly, the roller engagement path extends, as seen in the direction of the width thereof, perpendicular to the axis of the shaft 9. As seen in the circumferential direction, the roller engagement path has a slope varying between 90° and 90°−α with respect to the longitudinal axis of the shaft 9.

The body of the wobble disc inside the roller engagement path 50 has been deformed in such a way that an inner edge 52 around a central opening 53 for the shaft 9 is plane and extends perpendicular to the shaft 9 in such a way that a boss 55 may be secured to the inner edge 52 for securing the disc to the shaft.

The roller carriers 32 are arranged in such a way that the axes of the rollers 30 extend radially with respect to the shaft 9 and, accordingly, the generatrices of the rollers and the generatrices of the roller engagement parths extend parallel with each other and will be maintained parallel with each other due to the parallelogram link suspension when the wobble discs 10 and 11 are rotated by means of the shaft 9 and, accordingly apply reciprocating movements to the rollers perpendicular to the direction of travel 63. As it moreover appears from FIG. 1 the axes of the rollers 30 extend in a common plane and in the longitudinal direction of the harrow in such a way that the two rollers of each pair of rollers engage diametrically with the corresponding wobble disc.

A pair of wheels is connected to the reverse frame member 3 of the harrow. The wheels 60 are indicated only, because they are of a kind known per se and, accordingly, they may be adjustable in the vertical direction in order to adapt the soil engagement depth of the harrow teeth. To the forward frame member 2, securing means 61 is secured, shown schematically, for suspending the harrow in the lift of a tractor to be used for moving the harrow.

The harrow illustrated operates in the following way:

Simultaneously with the moving of the harrow in the direction of travel as indicated by the arrow 63, the shaft 9 is rotated by means of a driving shaft of the tractor connected by a connecting shaft (not shown) to the input shaft 8. Accordingly, the wobble discs 10 and 11 are rotated and reciprocating movement in the transverse direction is applied to the rollers 30 due to the oblique position of the wobble discs on the shaft 9. Accordingly, the roller carriers 32 will oscillate the corresponding traverses 20 and 21 about the bearings 24 and 25, viz. about the mid-positions of the traverses shown in FIG. 1 and, accordingly, the beams 16 and 17 and the harrow teeth connected thereto will be moved laterally with respect to the direction of travel 63 and opposite each other. The sleeves 28 of elastomeric material incorporated into the suspensions between the traverses and the beams permit oscillations of the traverses and the beams within the range of movement caused by the wobble discs. During the travel of the harrow, loads will be applied to the beams 16 and 17, due to the engagement of the harrow teeth in the soil. Such loads may be rather heavy, but due to the fact that they are transferred by means of the transverses 20 and 21 to the frame of the harrow via the bearings 24,25 and the frame members 22 and 23, the wobble discs and the rollers cooperating therewith will be relieved of such loads to a considerable extent. The suspension of the beams in the traverses achieved by means of the elastomeric sleeves 28 also adds to this effect. Accordingly, the engagement explained above between the wobble discs 10 and 11 and the rollers 30 cooperating therewith is maintained in such a way that the rollers will cooperate with the corresponding roller engagement paths on the wobble discs with the generatrices of the rollers and the axes thereof extending parallel with the generatrices of the roller engagement paths and in the direction of travel of the harrow.

Moreover, the sleeves 28 of elastomeric material will cause a smooth operation of the implement. According to the embodiment illustrated in the drawing, the roller carriers 32 are supported almost mid-way between the bearings 24 and 25 for the traverses and the pivots 27 of the beam suspensions. By means of such arrangement, a gearing ratio between the reciprocating movement of the beams and the pitch of the wobble discs is achieved. It will be understood that such gearing ratio may be changed by increasing the length of the traverses and by arranging the beams 16 and 17 along the outer sides of the suspensions 27,28,29 instead of arranging the beams along the inner sides of the suspensions as indicated on the drawing.

I claim:

1. A harrow comprising transversely with respect to the direction of travel of the harrow extending harrow teeth supporting beams, a shaft also extending transversely with respect to the direction of travel of the harrow, wobble discs secured to the shaft and cooperating with pairs of rollers connected to the beams in such a way that the beams and the harrow teeth supported thereby are reciprocated transversely with respect to the direction of travel of the harrow by rotation of the wobble discs, wherein two traverses being pivotally supported by the frame of the harrow about vertically extending axes, the traverses extending, in mid-positions of the traverses, in the direction of travel of the harrow, a beam being pivotally connected to the forward ends of the traverses and another beam being pivotally connected to the rear ends of the traverses, two roller carriers being pivotally connected to each of the traverses about vertically extending axes, each carrier supporting, at one of its ends, a roller cooperating with the corresponding wobble disc, the two roller carriers of each traverse being mutually connected by means of a connecting link pivotally connected to the frame of the harrow, in such a way that each traverse together with its roller carriers and the corresponding connecting link form a swinging parallelogram link suspension controlling the rollers so as to maintain the axes of the rollers in the direction of travel of the harrow during engagement between the rollers and paths provided on the wobble discs, the paths of the wobble discs being generated by generatrices extending perpendicular to the shaft of the wobble discs.

2. A harrow according to claim 1, wherein each pivotal connection between the ends of the traverses and the beams comprises a pivot secured to the corresponding traverse, a sleeve consisting of elastomeric material surrounding the pivot and a bushing secured to the corresponding beam and surrounding the sleeve of elastomeric material.

* * * * *